B. L. STOWE.
METHOD OF MAKING PNEUMATIC TIRES.
APPLICATION FILED NOV. 25, 1916.
1,321,402.
Patented Nov. 11, 1919.
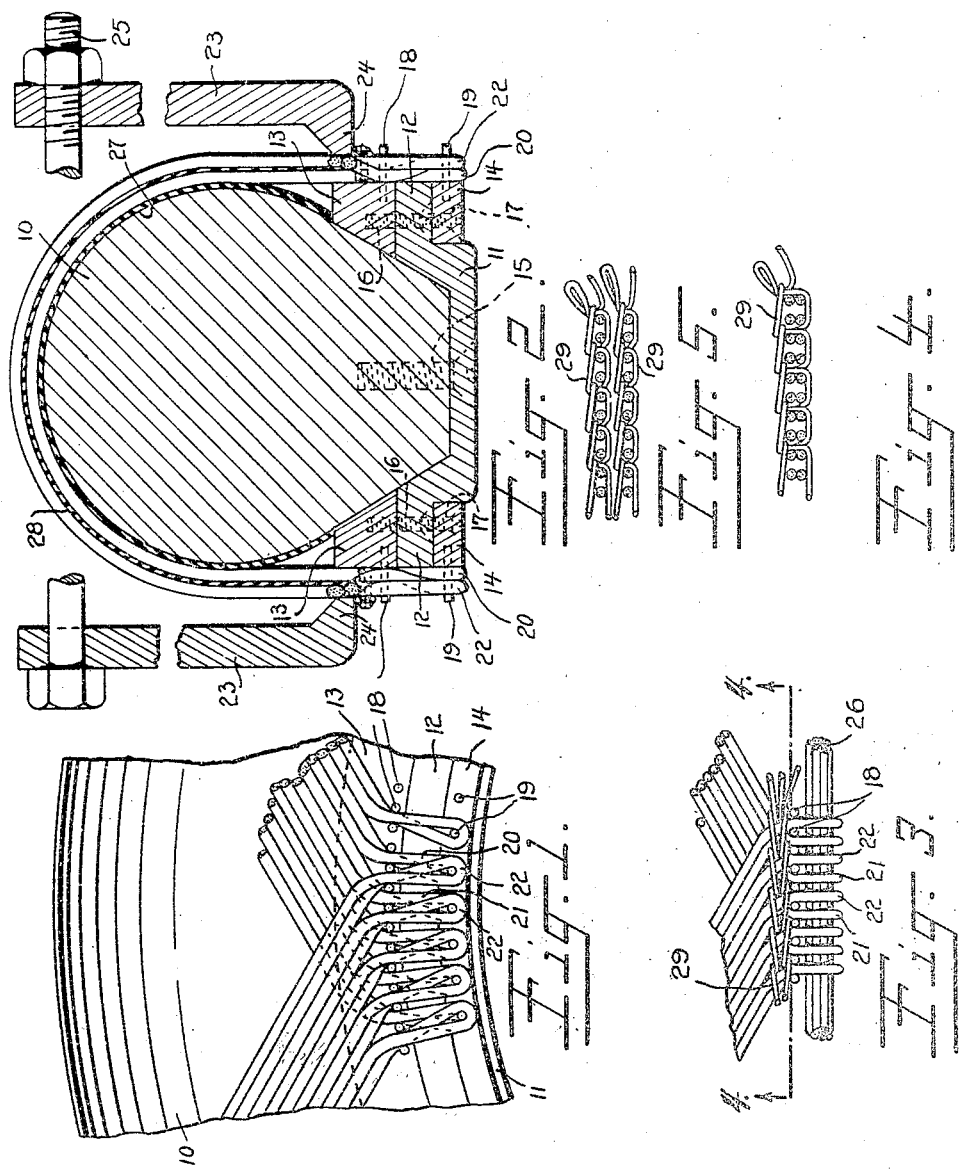
Attest:
by
Inventor:
Benjamin L. Stowe,
Ernest Hopkinson
his Atty

UNITED STATES PATENT OFFICE.

BENJAMIN L. STOWE, OF JERSEY CITY, NEW JERSEY, ASSIGNOR TO MORGAN & WRIGHT, A CORPORATION OF MICHIGAN.

METHOD FOR MAKING PNEUMATIC TIRES.

1,321,402.  Specification of Letters Patent.  Patented Nov. 11, 1919.

Application filed November 25, 1916. Serial No. 133,302.

*To all whom it may concern:*

Be it known that I, BENJAMIN L. STOWE, a citizen of the United States, residing in Jersey City, county of Hudson, and State of New Jersey, have invented certain new and useful Improvements in the Methods for Making Pneumatic Tires, of which the following is a full, clear, and exact description.

My invention relates to that class of tires which are known as cord tires. An object is to produce a cord tire in which the cords pass entirely around the bead rings and the cords of one layer pull on the bead rings against those of the contiguous layer so that the cords are securely anchored.

In the manufacture of cord tires it is customary to build the tire from a single length of cord doubled backward and forward upon itself so that it provides a series of lengths of cord extending side by side. In one method the cord is looped around pins carried by a suitable form so that the lengths of cord, or cords as they are called, pass obliquely or diagonally across the form between the pins, the direction of the cords of contiguous layers being reversed. My present invention, by a peculiar arrangement of such pins or their equivalent permits of novel loops being initially formed at the margins of the tire, and being then subsequently readjusted without disturbing the rest of the tire, to receive bead rings in such a manner that the oppositely extending cords of contiguous layers pull against each other upon, and thus positively lock each other to, the bead rings.

The invention can be easily understood from the following description taken in connection with the accompanying drawing in which—

Figure 1 is a fragmentary side elevation of apparatus suitable for constructing my improved tire, showing preliminary cords of the tire in position thereon.

Fig. 2 is a cross-sectional view of the apparatus showing the tire clamped to permit of application of the bead rings.

Fig. 3 is a fragmentary view showing stitches for securing the cords against displacement.

Fig. 4 is a cross-sectional view on the line 4—4 Fig. 3.

Fig. 5 is a fragmentary cross-sectional view showing a modified form of stitching.

An apparatus suitable for use in winding my improved cord tire, in its preferred form, comprises a ring core 10, which is equipped on the inner surface with a ring 11, the same being provided on the opposite sides of the core with offset flanges 12 to the outer and inner surfaces of each of which rings 13 and 14 are secured. The ring 11 is attached to the core by screws 15 and the rings 13 and 14 are attached by screws 16 and 17 to the respective flanges 12. All of these rings are formed in sections so that they may be readily removed when desired. Pins 18 project from each outer ring 13 and extend in a direction parallel with the axis of the core, these pins being arranged in a circular series and being equal in number, in the present embodiment, to the number of cords in a single layer. Pins 19 project from each inner ring 14 in a circular series concentric with the series of pins 18, and these pins, in the present embodiment, are equal in number to one-half the number of cords in a single layer.

One method of constructing the tire will be described. A loop 20 of the cord is passed diagonally across the surface of the core and pressed into the space between two of the outer pins 18, the bight in the loop being then hooked over one of the pins 19. This is repeated on the opposite side of the core. The next loop 21 of the cord is then brought across the core and pressed into the space between two of the pins 18, but not in the space next adjoining the one the first mentioned loop 20 occupies, but into the space once removed from that space. The loop 21 is carried to and hooked upon the pin 19 adjoining the one upon which the previous loop 20 was hooked. This operation of passing loops across the core, pressing the same into every other space between the pins 18, and hooking the loops upon the pins 19, is performed alternately first on one side of the core and then on the other side of the core, and is continued until a complete layer of diagonally extending cords is formed on the core.

The second layer, having its cords at approximately a right angle to those of the first laid layer, is then begun, the loops 22 of the cord being brought across the core to and passed between the pins 18 as above described, but in this instance the loops are pressed into the spaces between the pins 18 not occupied by loops of the first laid layer. The loops are hooked upon the same pins as the loops of the first layer, so that a loop of cord of the first layer and a loop of cord of the second layer, that occupy adjoining spaces between the pins 18, will be hooked upon the same pin 19. More than two layers may be laid if desired, but for the present description the winding will be considered complete when all the cords of the first and second layers are laid.

When the winding operation above described is finished, a pair of annular clamps 23 are applied to the tire, these clamps each having a flange 24 that is slightly larger than the diameter of the outer circle of pins 18. When the clamps are drawn together by clamp bolts 25 the flanges will clamp the cords tightly against the outer rings 13 just outside of the circle of pins 18, and will prevent the cords from drawing back through the pins 18 and loosening upon the core when bights of the loops are unhooked from the pins 19 by removing the rings 14.

After the rings 14 are removed, the loops which now hang loosely below the pins 18 at each margin of the tire, are given a slight twist to bring them into register with each other. Bead rings 26, each preferably formed of a continuous length of wire, are now applied within the alined loops. After insertion of both bead rings, the clamps 23 are removed, then the rings 11 and 13 are removed and the pins 18 withdrawn from the tire. The core 10 may now be removed from the tire if desired, or the tire may be completed and vulcanized on the core before its removal if desired. In the latter event the core will be first treated with rubber 27, before application of the cords thereto, and in any case all desired rubberizing of cords, or placing of rubber 28 between the layers will be performed at the required stages of the building operation.

It will be noted that by using two concentric circular series of pins 18 and 19 I am enabled to so initially position the loops at the margins of the tire that the two loops, one from each layer, which occupy a common pin 19, cross each other outside the pins 18. This is illustrated by the loops 21 and 22, Fig. 1. The pins 18 temporarily anchor the loops in this crossed relation during the readjustment of the bights of the loops to receive the bead rings, and during application of the bead rings, so that the rest of the tire beyond this anchorage of the loops is not disturbed and the work already performed in accurately laying the cords upon the core is not impaired. In the product the loops, one from each layer, cross each other near the bead rings, and as they extend in opposite directions from the bead rings, they will pull against each other on the bead rings and positively lock each other thereto.

To positively prevent displacement of the cords I tie the same together preferably just outside of pins 18 by means of looped stiches 29, preferably applied while the cords are being laid, and the stitching may be accomplished by the use of knitting needles or any other suitable means. The stitches prevent the cords from moving laterally and firmly unite them with each other. The looped stitches, in the present embodiment, are illustrated as binding together one loop of the outer layer and one loop of the inner layer as shown in Figs. 3 and 4, and a modification is illustrated in Fig. 5 in which the stitches are shown as binding the loops of each layer together independently of the other layer. Various other modifications of the tying device 29 such as forming the same of metal, or altering the shape of the same, may be resorted to but will not be herein described.

While I have described a specific embodiment of the invention I do not wish to be limited to the exact construction and disclosure since various modifications may be resorted to within the scope of the appended claims without departing from the spirit or sacrificing any of the advantages of the invention.

Having thus described my invention, what I claim and desire to protect by Letters Patent is:

1. In the manufacture of a cord tire, the process of doubling a cord backward and forward upon itself to provide loops of cord crossing each other in the tire and having their bights disposed at the margins of the tire, temporarily anchoring the loops near the bights while doubling said cord to maintain the crossed relation of the loops, subsequently readjusting the bights of the loops to register with each other without disturbing the tire beyond the anchorage of the loops, passing bead rings through the registering loops to connect them together in crossed relation, and releasing the anchored loops.

2. In the manufacture of a cord tire, the process of doubling a cord backward and forward upon itself to provide a layer of successive loops of cord crossing the tire and having their bights disposed at the margins of the tire, superposing thereon a similar layer having its loops extending at an angle to the first layer, temporarily anchoring the loops near the bights while doubling the cord to maintain the crossed relation of the loops, subsequently readjusting the bights of the loops of each layer to register with those of the contiguous layer without disturbing the tire beyond the anchorage of the loops, passing bead rings through the registering loops to connect them together, and releasing the anchored loops.

3. In the manufacture of a cord tire, the process of doubling a cord backward and forward upon itself to provide loops of cord crossing each other in the tire and having their bights disposed at the margins of the tire, temporarily anchoring the loops near the bights while doubling said cord to maintain the crossed relation of the loops, tying the loops together near the anchorage thereof, readjusting the bights of the loops to register with each other without disturbing the tire beyond the anchorage of the loops, passing bead rings through the registering loops to connect them together and releasing the anchored loops.

4. In the manufacture of a cord tire, the process of doubling a cord backward and forward upon itself to provide loops of cord crossing each other in the tire and having their bights disposed at the margins of the tire, temporarily anchoring the loops near the bights, while doubling the cord to maintain the crossed relation of the loops, clamping the loops near the temporary anchorage of the loops to prevent them from loosening, then readjusting the bights of the loops to register with each other, passing bead rings through the registering loops to connect them together, and releasing the anchored and clamped loops.

Signed at Jersey City this sixteenth day of November 1916.

BENJAMIN L. STOWE.